(12) United States Patent
Kuemmerle et al.

(10) Patent No.: US 9,860,362 B2
(45) Date of Patent: Jan. 2, 2018

(54) METHOD FOR CONTROLLING A COOKING APPLIANCE, AND COOKING APPLIANCE

(71) Applicant: E.G.O. Elektro-Geraetebau GmbH, Oberderdingen (DE)

(72) Inventors: Hannes Kuemmerle, Oberderdingen (DE); Ewald Bayer, Dormettingen (DE); Jordi Alvarez Raventos, Oberderdingen (DE); Kay Schmidt, Oberderdingen-Flehingen (DE); Pierre Metzner, Oberderdingen (DE); Steffen Weiss, Zaisenhausen (DE); Gerd Knappe, Bretten (DE); Oliver Zabel, Karlsruhe (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 0 days.

(21) Appl. No.: 15/493,669

(22) Filed: Apr. 21, 2017

(65) Prior Publication Data
US 2017/0310810 A1 Oct. 26, 2017

(30) Foreign Application Priority Data
Apr. 22, 2016 (DE) .......................... 10 2016 206 912

(51) Int. Cl.
*H04B 7/00* (2006.01)
*H04M 1/725* (2006.01)
(Continued)

(52) U.S. Cl.
CPC ..... *H04M 1/72533* (2013.01); *H04M 1/7253* (2013.01); *H04W 24/08* (2013.01); *H04W 4/008* (2013.01)

(58) Field of Classification Search
CPC ........... H04M 1/72533; H04M 1/7253; H04W 24/08; H04W 4/008
(Continued)

(56) References Cited

U.S. PATENT DOCUMENTS 9,730,032 B2 * 8/2017 Choi ........................ H04W 4/06
2002/0094778 A1 * 7/2002 Cannon ................. H04W 88/02
455/41.3

(Continued)

FOREIGN PATENT DOCUMENTS

DE 19802558 A1 7/1999
DE 102004048254 A1 4/2006
(Continued)

*Primary Examiner* — April G Gonzales
(74) *Attorney, Agent, or Firm* — Alston & Bird LLP

(57) ABSTRACT

A method for controlling a cooking appliance using a mobile terminal that is separate from the cooking appliance, both of which have a controller and a BLE communication device, involves the following steps being performed: switching on the cooking appliance and the terminal, setting up a communication link between the two by means of a specified user process on the cooking appliance or on the terminal and confirming the set-up of the communication link by means of a user process by the user on the cooking appliance. A signal strength of the communication link between the two communication devices at the time of confirmation of the communication link on the cooking appliance is stored and is monitored during use. If the signal strength drops below a prescribed signal strength limit value, then user commands from the mobile terminal are blocked.

18 Claims, 1 Drawing Sheet

(51) Int. Cl.
*H04W 24/08* (2009.01)
*H04W 4/00* (2009.01)

(58) Field of Classification Search
USPC ......................................................... 455/41.3
See application file for complete search history.

(56) References Cited

U.S. PATENT DOCUMENTS

| | | | |
|---|---|---|---|
| 2006/0062193 A1* | 3/2006 | Choi | H04B 7/2628 370/342 |
| 2007/0053383 A1* | 3/2007 | Choi | H04W 48/12 370/469 |
| 2007/0153684 A1* | 7/2007 | Choi | H04W 72/06 370/229 |
| 2010/0329173 A1* | 12/2010 | Murphy | H04L 29/12066 370/313 |
| 2014/0159877 A1* | 6/2014 | Huang | G08C 17/02 340/12.5 |
| 2015/0325118 A1* | 11/2015 | Yu | G08C 23/04 398/106 |
| 2017/0026506 A1* | 1/2017 | Haepp | H04L 12/282 |

FOREIGN PATENT DOCUMENTS

| | | |
|---|---|---|
| DE | 102012214797 A1 | 2/2014 |
| DE | 102013006082 A1 | 10/2014 |
| DE | 102013226390 A1 | 6/2015 |
| DE | 102014203582 A1 | 8/2015 |
| DE | 102014215778 A1 | 2/2016 |

* cited by examiner

METHOD FOR CONTROLLING A COOKING APPLIANCE, AND COOKING APPLIANCE

CROSS-REFERENCE TO RELATED APPLICATIONS

This application claims priority to German Application No. 10 2016 206 912.8, filed Apr. 22, 2016, the contents of which are hereby incorporated herein in its entirety by reference.

TECHNOLOGICAL FIELD

The invention relates to a method for controlling a cooking appliance using a mobile terminal that is separate from the cooking appliance, preferably a mobile phone or a tablet computer.

BACKGROUND

DE 19802558 A1 discloses the practice of controlling a hob as a cooking appliance using a remote control. The remote control can operate by means of an IR transmission link, for example.

BRIEF SUMMARY

The invention is based on the object of providing a method for controlling a cooking appliance as cited at the outset and also a cooking appliance designed for performing this method that are able to solve problems of the prior art and particularly allowing cooking processes on the cooking appliance to be performed conveniently and safely.

This object is achieved by a method and a cooking appliance designed for performing this method. Advantageous and preferred configurations of the invention are the subject of the further claims and are explained in more detail below. In this case, some of the features are described only for the method or only for the cooking appliance. However, regardless of this, they are intended to be able to apply by themselves both for the method and for the cooking appliance independently of one another. The wording of the claims is made the content of the description by means of express reference.

The method allows a cooking appliance, particularly a hob, to be controlled using a mobile terminal that is separate from the cooking appliance. The cooking appliance has at least one heating device or another functional unit. Equally, it has at least one user element for the input of user commands by a user, advantageously a user apparatus having multiple such user elements. These may be mechanically operable or else may be what are known as touch sensors. Furthermore, the cooking appliance has a controller, a communication device for wireless communication with the mobile terminal and if need be, an indicator that can operate visually and/or audibly.

The mobile terminal has a communication device of its own, a controller and an input device for the input of user commands by a user. The input device on the mobile terminal advantageously uses touch sensors as are known. This is inherently standard practice, however, for mobile terminals such as mobile phones or tablet computers, for example.

The method has the following steps. First, the cooking appliance and the mobile terminal are switched on or they should be on. Sometimes, it is necessary for an applicable program or what is known as an app to be started on the mobile terminal. A specified user process on the cooking appliance and/or on the mobile terminal that is used to set up the communication link between the two devices then sets up this communication link. Advantageously, the specified user process takes place on the mobile terminal, for example it can be automatically initiated by the previously described starting of the program or of the app. The set-up of a communication link is then confirmed by means of a user process by the user on the cooking appliance. This is advantageously effected by operating an aforementioned user element of the cooking appliance. This ensures that the user is aware of this set-up of the communication link and it is set up deliberately. Advantageously, this confirmation is effected within a prescribed confirmation time, otherwise the communication link is dropped again or not set up. This is explained in even more detail below.

A signal strength of the communication link between the communication devices of the cooking appliance and the mobile terminal at the time of the confirmation of the communication link on the cooking appliance is stored, advantageously in the controller of the cooking appliance. While the communication link exists or while the cooking appliance is controlled by the mobile terminal, the current signal strength of the communication link on the cooking appliance or the signal strength of user commands that are sent by the mobile terminal by radio is then monitored. This can also be effected on both devices, but advantageously at least on the cooking appliance. The cooking appliance can then be used by means of the mobile terminal by virtue of the input of user commands thereon by the user, for example a heating device or another functional unit can have its power or other mode of operation altered, can be switched on or can be switched off. This can be effected both on the mobile terminal and on the hob itself.

If a drop beyond a particular extent is identified while monitoring the current signal strength of the communication link, that is to say if the signal strength drops below a prescribed signal strength limit value, which can be determined from the communication link itself and/or from a received user command from the mobile terminal to the cooking appliance, then at least user commands from the mobile terminal are blocked on the cooking appliance or sometimes even the communication link between the cooking appliance and the terminal is disconnected. This safety function means that it can and is meant to be identified when a user with the mobile terminal moves too far away from the cooking appliance. The reason is that there is then the problem that there is probably no further or no further unrestricted visual contact with the cooking appliance and hence it is no longer possible to control precisely how the cooking appliance is operating. For safety reasons, user commands from the mobile terminal to the cooking appliance are blocked and disconnection of the communication link is then possibly even performed. In this case, one configuration of the invention may have provision for the hob to continue to operate in the most recently safely operated state, that is to say that it does not have to have a power of a heating device reduced or shut down completely. It can just no longer be controlled using the terminal. On the cooking appliance itself, normal control continues to be possible without restrictions, however. This requires the user to be standing near to the cooking appliance again, of course.

In one configuration of the invention, there may be provision for a single user command or the operation of a single user element to be sufficient for the specified user process for setting up the communication link between the cooking appliance and the mobile terminal. As explained previously, the mere starting of a program or app on the mobile terminal could be sufficient as an applicable user command in this case, but no later than when it calls for a specific user command on the terminal that can be displayed graphically as applicable, and the user command is then input.

In an alternative configuration of the invention, there may be provision for the operation of a user element on the cooking appliance and the operation of a user element on the mobile terminal to be necessary for the specified user process for setting up the communication link between the cooking appliance and the mobile terminal. Thus, although the complexity is somewhat increased, user safety is distinctly increased at the same time.

In an advantageous configuration of the invention, the confirmation of the set-up of the communication link and/or the disconnection of the communication link can be indicated visually and/or audibly. As such, a user is also reliably informed that the communication link and hence the option to control the cooking appliance by means of the mobile terminal have been set up. Such indication can take place at least on the mobile terminal, advantageously also on the cooking appliance. An audible indicator should be short, for example in the form of a single or multiple signal tone. A visual indicator, by contrast, can also exist permanently, for example by virtue of an applicable light indicator on the terminal and/or on the hob indicating that the communication link has been set up and exists.

In the further configuration of the invention, a status of the cooking appliance, particularly also of the heating device or functional unit controlled or controllable using the mobile terminal, can be indicated on the mobile terminal. This can also take place when the signal strength of the communication link has changed more than is permissible. Hence, a user can see on the mobile terminal all information that would also be indicated on the hob and that, in particular, is advantageous for safe and convenient control of the cooking appliance by the terminal. For this, however, reference is made to the prior art cited at the outset and also to the other known prior art, which describes numerous options therefor. Thus, it is also possible for automatic cooking programs to run on the mobile terminal and to send user commands to the cooking appliance, either semi-automatically with a proposal by the program and respective confirmation by the user or else automatically. Hence, a user can perform easily determined cooking programs, the individual data and parameters being prescribed by the terminal. As an advantage over normal manual use of the cooking appliance after reading from the terminal, a user command proposed on the terminal can simply be confirmed by the user. By way of example, it is thus possible for the terminal to propose a cooking level "7" for a hob in the course of a cooking program, which then simply needs to be confirmed by the user. This is discernibly simpler than having to set the cooking level "7" on the hob oneself.

In a configuration of the invention, there may be provision, after the communication link has been disconnected on account of excessively low or excessively fallen signal strength, that is to say when there has been a drop below the signal strength limit value cited at the outset, for the communication link not to be restored automatically, even if the signal strength should then rise again as a result of renewed proximity. The communication link is restorable only by means of a specific user procedure, this specific user procedure advantageously corresponding to the method for first setting up or for confirming the communication link, as has been explained at the outset. This ensures that even after conscious control of the cooking appliance by the mobile terminal and disconnection of the communication link, the latter is restored consciously and deliberately by a user in order to avoid user errors or hazardous situations.

There may be provision for a signal change or signal decrease of more than 7 or 8 dBm maximum, preferably 5 dBm maximum, to block the user commands from the terminal or even to disconnect the communication link. Alternatively, there may be provision for the aforementioned signal strength limit value to be no more than 50% of the signal strength at the time of the confirmation of the communication link on the cooking appliance. Advantageously, the signal strength limit value is no more than 20% of the signal strength at the time of the confirmation of the communication link. Thus, if the signal strength falls to below 20% of the signal strength when the communication link is confirmed, then the controller steps in.

In an advantageous configuration of the invention, the prescribed confirmation time for confirming the set-up of a communication link may be no more than 10 sec, it advantageously being no more than 3 sec. This means that a user cannot wait too long until he has to confirm the set-up of the communication link on the cooking appliance following a request from the mobile terminal.

In a further configuration of the invention, there may be provision for operation of a user element, which can also be used to confirm the set-up of a communication link, for a time longer than the aforementioned prescribed confirmation time to be followed by the cooking appliance, of its own accord, looking for a mobile terminal that is ready for a communication link to the cooking appliance. Such a time can last 5 sec longer than the aforementioned prescribed confirmation time, for example. Furthermore, it is possible for operation of this user element for an even longer time, for example more than 10 sec or more than 20 sec, to prompt the communication link to a mobile terminal to be disconnected by the cooking appliance.

Advantageously, a communication link can operate according to the Bluetooth standard, particularly according to the BLE standard. This involves the use of lower signal strengths, which in some cases could be preferred for safety reasons. Furthermore, with such lower signal strengths, a drop in the signal strength, as is needed in order to be able to perform the disconnection of the communication link described above, can occur to a greater degree and hence be better discernible. Finally, a communication link needs to be disconnected in any case when there is a distance of more than 10 m and a clear view between the cooking appliance and the mobile terminal, for example, for safety reasons. Alternatively, a different or similar radio link can be used, for example according to the ZigBee standard.

In one configuration of the invention, it is possible for, in the event of the communication link being set up as a result of performance of a user command for the cooking appliance on the mobile terminal and subsequent confirmation of the set-up of the communication link on the cooking appliance, this initiating user command also to be performed immediately on the cooking appliance. This means that a faster user process can take place, and, as a result of the previously described sequence of the cited steps, within a few seconds, which is inevitable if it is also certain that the user command is actually wanted by the user and is also controlled, as it were. Thus, it is possible, following confirmation of the set-up of the communication link on the cooking appliance, to dispense with having to input a user command once again directly on the mobile terminal.

Advantageously, the cooking appliance is simply an aforementioned hob, that is to say has multiple heating devices, for example four heating devices for four cooking zones. These four cooking zones can then be controlled by means of the mobile terminal. If need be, it is also possible for further settings to be made, such as the programming of a timer or of what are known as boost power levels for the heating devices, which involve an oversized power being produced for a short prescribed time, which power cannot remain set as continuous power, however.

These and further features are evident not only from the claims but also from the description and the drawings, the individual features each being implemented by themselves or in multiples in the form of subcombinations for an embodiment of the invention and in different fields and being able to be advantageous and independent protectable embodiments for which protection is claimed here. The division of the application into individual sections and subheadings does not limit the general validity of the statements made thereunder.

BRIEF DESCRIPTION OF THE SEVERAL VIEWS OF THE DRAWINGS

Exemplary embodiments of the invention are depicted schematically in the drawings and are explained in more detail below. In the drawings.

DETAILED DESCRIPTION

Figure 1:
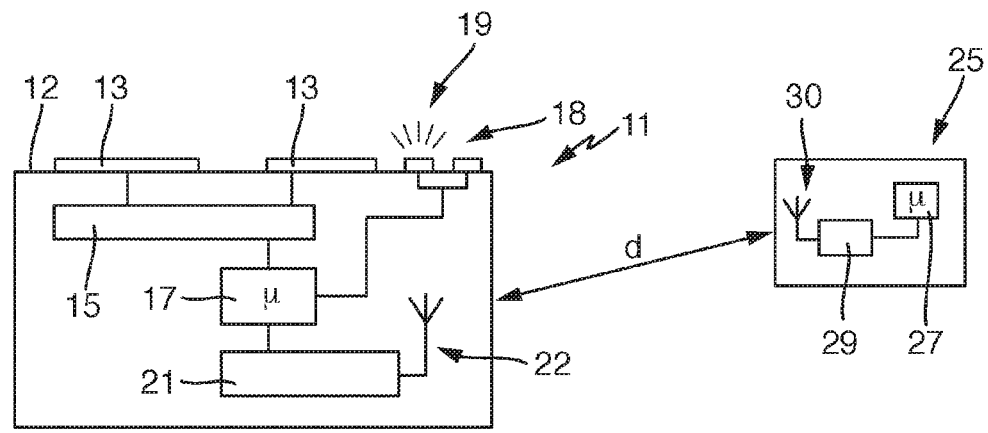
FIG. 1 shows a schematic depiction of use of a hob with a mobile phone as the terminal.

FIG. 1 depicts a hob 11 according to the invention as a cooking appliance in a very highly schematic manner. A top or a hob plate 12 of the hob has multiple heating devices 13 that are actuated and supplied with power, and can therefore be operated, by a power actuating circuit 15 in the hob. The power actuating circuit 15 is connected to a controller 17 of the hob 11. The controller 17 may be a central controller for the whole hob 11 and, by way of example, can actuate a user element 18 of a user device and also a visual indicator 19 atop the hob 11. Naturally, as is standard in modern cooking appliances and hobs, there may be also provision for substantially more user elements and visual indicators of modern design.

The controller 17 is connected to a communication device 21 along with the antenna 22, which operates according to the Bluetooth standard, advantageously even according to the BLE standard, that is to say at low power. This serves the aforementioned purpose of a type of distance determination or determination of a particular minimum distance or limit distance in the range of a few meters, for example 5 m to 10 m, being better possible by virtue of monitoring of the signal strength. Alternatively, it could operate according to the ZigBee standard or another similar radio protocol.

Furthermore, FIG. 1 shows a mobile phone 25 as the mobile terminal according to the invention. The mobile phone 25 is in the form of a smartphone and contains not only a standard controller 27 but also a communication device 29 along with the antenna 30, which is also designed according to the Bluetooth standard or advantageously the BLE standard.

In the depiction that can be seen here, the mobile phone 25 is located within a distance d from the hob 11 or, to be precise, the antennas 22 and 30 are at this distance from one another. Owing to the known limited device dimensions of the hob 11 and the mobile phone 25, this is irrelevant, however.

Figure 2:
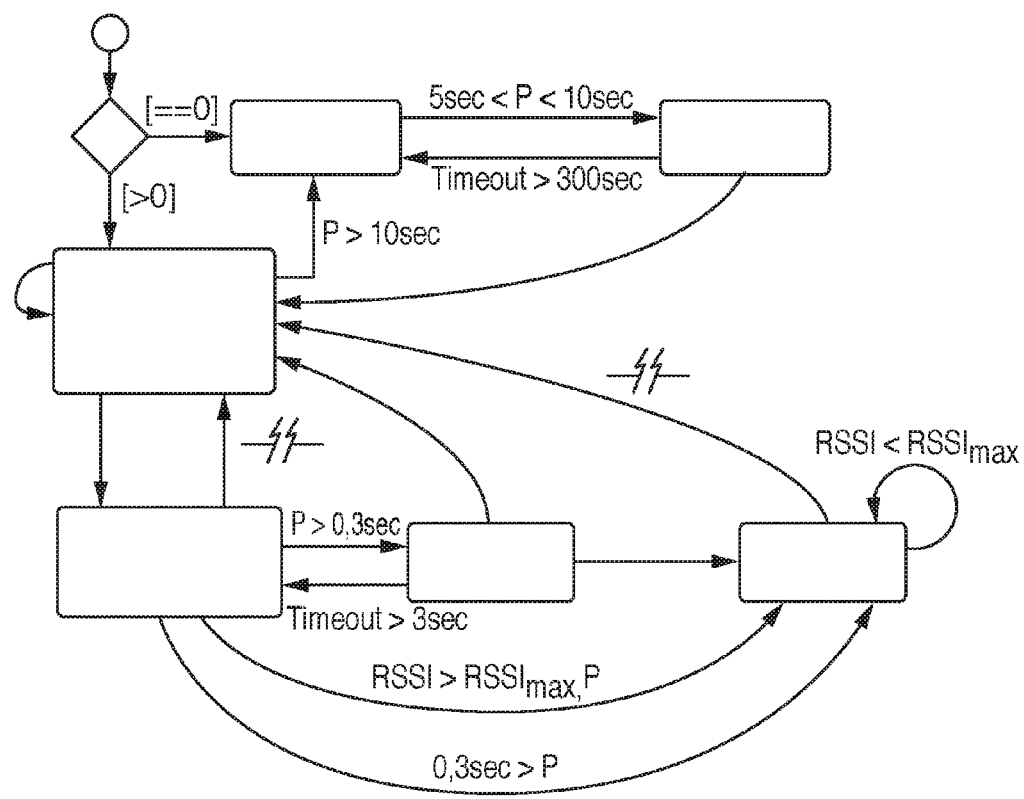
FIG. 2 shows a depiction of a state machine in order to depict the sequence of the method and the operation of the controller.

The state machine according to FIG. 2 more or less schematically shows the sequence of the method according to the invention, or the sequence can be comprehended therefrom. At the beginning, the hob 11 and the mobile phone 25 are on and are intended to connect to one another, for example on the basis of user control on the mobile telephone 25, for control purposes. If a device that is ready to connect is not found by the hob 11, then the rightward arrow shows that a connection is awaited at that point. The user element 18 on the hob 11 can then be operated as "P", for example for a time between 5 sec and 10 sec, so that the hob enters a mode for connection set-up and attempts to set up a connection to a mobile terminal. If this is not possible within a time of 5 min, for example, then the controller returns after the timeout and waits, as it were, for the user element 18 to be operated again for a new search, if need be. If the connection to the mobile phone 25 is successful as the box to the right thereof, then set-up of the communication link starts and moves to the large box at the top left. The set-up of the communication link is attempted so long as one of the following events occurs. The user element 18 is pushed as "P" again for a time longer than 10 sec, for example then the connection to the mobile phone 25 is disconnected again, as shown by the curved upward arrow. Possible confirmation on the mobile phone 25 and confirms the communication link, which then exists as the box at the bottom left. If the user element 18 is then operated for more than 0.3 sec, for example, then the method moves to the box to the right thereof, that is to say at the bottom centre. The communication link has then been set up and the hob 11 can be used using the mobile telephone 25, as shown by the box at the bottom right. It is possible for hotplates of the hob to be switched on and off and for the powers thereof to be adjusted and altered, for example. So long as there is a signal strength RSSI at the communication device 21 on the hob 11 below the cited signal strength limit value $RSSI_{max}$, the communication link is active and the hob 11 can be used using the mobile terminal. The hob 11 can have either all or at least many functions confirmed from the mobile phone 25, particularly including power adjustment, switching-on and switching-off of heating devices 13. For other radio protocols, it would be a signal strength limit value with a different name.

If the communication link is not confirmed by the mobile phone 25, however, then the method returns to the box at the bottom left. Although the two devices are then connected to one another, this is not such that the communication link is functional for desired usability.

As has been described above, the communication link could also be disconnected again in this state by virtue of operation of the user element for a long period, for example more than 10 sec, or, as depicted here, user commands from the mobile phone 25 are blocked when a connection exists per se. By operating the user element for more than 10 sec, it is also possible to decouple or disconnect all known and connected external devices. The hob 11 then enters a state in which no further external use is possible and also no further status information is sent. Only fresh initiation of the coupling process or connection process reactivates the communication device 21.

At the time of confirmation of the communication link, the signal strength RSSI at the hob 11 or at the communication device 21 is measured. Furthermore, an aforementioned signal strength limit value $RSSI_{max}$ is defined, for example as no more than 50% or even no more than 20% of the signal strength at the time of confirmation of the communication link, as mentioned previously. Alternatively, a signal change of more than preferably 5 dBm or 7 dBm can block the commands or disconnect the communication link. This signal strength is measured continuously. So long as the signal strength does not change significantly, for example because the user with the mobile phone 25 is close to the hob 11 or at least the mobile phone 25 is close to the hob 11, that is to say that the distance d is short, the communication link is maintained, and the hob 11 can be controlled using the mobile phone 25. If a user moves far away, for example including out of a room, while the mobile phone 25 is located statically next to the hob 11, this does not result in the communication link being disconnected or in the commands being blocked. Although the user cannot monitor the state of the hob 11, at the same time he also cannot enter any user commands on it or change its operating state.

If the signal strength drops below the aforementioned signal strength limit value or changes too greatly, then the communication link is disconnected and it is at least no longer possible for the hob to be controlled using the mobile phone 25. User commands from the mobile phone 25 to the hob 11 are then simply blocked by the controller 17. Maintaining the communication link while simultaneously blocking user commands has the advantage that it is then a simple matter for the communication link to be restored or for user commands no longer to be blocked. This then merely requires the user element 18 to be operated again as "P", for example again for a time of shorter than 5 sec. In this way, the user signals that he is now close to the hob 11 again and has control again. However, it is possible for status information such as a set power or running timer of the hob 11 to continue to be indicated on the mobile phone 25, even if the external control by the mobile phone is no longer possible.

On such blocking of user commands owing to a drop below the signal strength limit value $RSSI_{max}$, the method returns from the box at the bottom far right to the box at the bottom far left. As a result of the described fresh operation of the user element 25 as "P" for a time shorter than 3 sec, which may also be necessary as a further safety function within 5 min, 10 min or 20 min, for example, the method again moves to the box at the bottom far right and hence to the previous controllability of the hob 11 by means of the mobile phone 25.

That which is claimed:

1. A method for controlling a cooking appliance using a mobile terminal, wherein said mobile terminal is separate from said cooking appliance, wherein said cooking appliance comprises at least one heating device, at least one user element for input of user commands by a user, a controller, a communication device for wireless communication with said mobile terminal, wherein said mobile terminal comprises a communication device, a controller, an input device for input of user commands by a user, and wherein said method comprises:

switching on said cooking appliance or said mobile terminal;

setting up a communication link between said cooking appliance and said mobile terminal by means of a specified user process;

confirming a set-up of a communication link by means of a user process by said user on said cooking appliance;

storing a signal strength of said communication link between said communication device of said cooking appliance and said communication device of said mobile terminal at a time of confirmation of said communication link on said cooking appliance;

monitoring a current signal strength of said communication link on said cooking appliance or of said signal strength of user commands sent by said mobile terminal by radio while said communication link exists;

using said cooking appliance by means of said mobile terminal by virtue of input of user commands on said mobile terminal by said user; and blocking user commands from said mobile terminal and/or disconnecting said communication link between said cooking appliance and said mobile terminal in an event of said signal strength of said communication link and/or of a received user command from said mobile terminal to said cooking appliance dropping below a prescribed signal strength limit value.

2. The method according to claim 1, wherein said specified user process is on said cooking appliance and/or on said mobile terminal.

3. The method according to claim 1, wherein a signal user command or operation of a single user element is sufficient for said specified user process for setting up said communication link between said cooking appliance and said mobile terminal.

4. The method according to claim 1, wherein operation of a single user element on both said cooking appliance and said mobile terminal is sufficient for said specified user process for setting up said communication link between said cooking appliance and said mobile terminal.

5. The method according to claim 1, wherein said confirmation of said set-up of said communication link and/or said disconnection of said communication link are indicated visually and/or audibly.

6. The method according to claim 5, wherein said confirmation of said set-up of said communication link and/or said disconnection of said communication link are indicated at least on said mobile terminal.

7. The method according to claim 1, wherein a status of said cooking appliance is indicated on said mobile terminal.

8. The method according to claim 7, wherein said status of said cooking appliance is indicated on said mobile terminal relating to said heating device or functional unit controllable using said mobile terminal.

9. The method according to claim 1, wherein after said communication link has been disconnected on account of excessively fallen signal strength, said communication link is restorable only by means of a method corresponding to said first set-up of said communication link.

10. The method according to claim 1, wherein a signal change of more than 7 dBm max. as a prescribed signal strength limit value disconnects said communication link.

11. The method according to claim 1, wherein said signal strength limit value is no more than 50% of said signal strength at said time of said confirmation of said communication link on said cooking appliance.

12. The method according to claim 11, wherein said signal strength limit value is no more than 20% of said signal strength at said time of said confirmation of said communication link on said cooking appliance.

13. The method according to claim 1, wherein said prescribed confirmation time for confirming said set-up of a communication link is no more than 10 sec.

14. The method according to claim 13, wherein said prescribed confirmation time for confirming said set-up of a communication link is no more than 3 sec.

15. The method according to claim 1, wherein said communication link is designed according to the Bluetooth standard.

16. The method according to claim 15, wherein said communication link is designed according to the BLE standard.

17. The method according to claim 1, wherein said communication link is set up as a result of performance of a user command for said cooking appliance on said mobile terminal, wherein subsequent to said inevitably following confirmation of said set-up of the communication link on said cooking appliance, said initiating user command is also performed immediately on said cooking appliance.

18. A cooking appliance, comprising a communication device and a controller that are designed for performing said method according to claim 1.

* * * * *